US012139650B2

(12) United States Patent
Liu et al.

(10) Patent No.: US 12,139,650 B2
(45) Date of Patent: Nov. 12, 2024

(54) METHOD FOR NANO-DEPTH SURFACE ACTIVATION OF PTFE-BASED MEMBRANE

(71) Applicants: CHINA THREE GORGES CORPORATION, Beijing (CN); CHINA THREE GORGES RENEWABLES (GROUP) CO., LTD., Beijing (CN); NANJING HAOHUI HI TECH CO., LTD., Jiangsu (CN)

(72) Inventors: Jianping Liu, Beijing (CN); Xin Xiang, Beijing (CN); Jianhua Wu, Jiangsu (CN); Yawei Zhu, Jiangsu (CN); Jingxin Zhao, Jiangsu (CN); Wenwei Li, Beijing (CN); Zhengfeng Shuai, Beijing (CN); Hong Wu, Jiangsu (CN); Jianping Wu, Jiangsu (CN); Fangliang Zhao, Beijing (CN)

(73) Assignees: CHINA THREE GORGES CORPORATION (CN); CHINA THREE GORGES RENEWABLES (GROUP) CO., LTD. (CN); NANJING HAOHUI HI TECH CO., LTD. (CN)

(*) Notice: Subject to any disclaimer, the term of this patent is extended or adjusted under 35 U.S.C. 154(b) by 0 days.

(21) Appl. No.: 17/785,074

(22) PCT Filed: Dec. 15, 2020

(86) PCT No.: PCT/CN2020/136604
§ 371 (c)(1),
(2) Date: Jun. 14, 2022

(87) PCT Pub. No.: WO2022/011959
PCT Pub. Date: Jan. 20, 2022

(65) Prior Publication Data
US 2023/0257635 A1  Aug. 17, 2023

(30) Foreign Application Priority Data

Nov. 5, 2020 (CN) .......................... 202011221828.1

(51) Int. Cl.
*C09J 7/24* (2018.01)
*B29C 59/00* (2006.01)
(Continued)

(52) U.S. Cl.
CPC ............... *C09J 7/24* (2018.01); *B29C 59/005* (2013.01); *B32B 3/30* (2013.01); *B32B 7/14* (2013.01);
(Continued)

(58) Field of Classification Search
CPC . B32B 2327/18; B32B 27/322; B29C 59/005; B29K 2027/18; C08J 2327/18
See application file for complete search history.

(56) References Cited

U.S. PATENT DOCUMENTS

2011/0058950 A1* 3/2011 Watanabe ............. F03D 1/0675
156/332
2020/0391496 A1* 12/2020 Belcher ............... B29C 66/1122

FOREIGN PATENT DOCUMENTS

CN     106313811 A  *  1/2017
DE  102007006634 A1  *  8/2008  ......... B23K 26/0006
(Continued)

OTHER PUBLICATIONS

English machine translation of JPH02127442 (Year: 1980).*
(Continued)

*Primary Examiner* — Scott W Dodds

(57) ABSTRACT

A method for nano-depth surface activation of a PTFE-based membrane and relates to the technical field of polymer composites is disclosed. The method comprises the following steps: covering a functional surface of a PTFE-based
(Continued)

nano functional composite membrane, performing surface activation treatment on a single surface of the membrane to which a bonding adhesive is applied, and migrating and complexing a high-toughness cold bonding adhesive tape on the membrane surface, with an activated structure layer, of the PTFE-based nano functional composite membrane through a mechanical adhesive applying device to form an adhesive-membrane complex. An extremely strong affinity and a high-strength bonding performance are generated between the membrane and the adhesive, and the adhesive-membrane complex is formed. Integration of membrane/adhesive bonding complexing, membrane/membrane bonding complexing and membrane/adhesive layer bonding is realized.

5 Claims, 2 Drawing Sheets

(51) Int. Cl.
| | |
|---|---|
| B32B 3/30 | (2006.01) |
| B32B 7/14 | (2006.01) |
| B32B 27/08 | (2006.01) |
| B32B 27/32 | (2006.01) |
| B32B 37/00 | (2006.01) |
| B32B 37/12 | (2006.01) |
| C08J 5/18 | (2006.01) |
| C09J 5/02 | (2006.01) |
| C09J 7/38 | (2018.01) |
| B29C 69/02 | (2006.01) |
| B29K 27/18 | (2006.01) |
| B29L 7/00 | (2006.01) |
| F03D 80/40 | (2016.01) |

(52) U.S. Cl.
CPC ............ *B32B 27/08* (2013.01); *B32B 27/322* (2013.01); *B32B 37/1292* (2013.01); *B32B 37/156* (2013.01); *C08J 5/18* (2013.01); *C09J 5/02* (2013.01); *C09J 7/385* (2018.01); *B29C 69/02* (2013.01); *B29K 2027/18* (2013.01); *B29L 2007/002* (2013.01); *B32B 2260/02* (2013.01); *B32B 2260/046* (2013.01); *B32B 2307/4026* (2013.01); *B32B 2307/412* (2013.01); *B32B 2307/7376* (2023.05); *B32B 2309/02* (2013.01); *B32B 2309/12* (2013.01); *B32B 2309/14* (2013.01); *B32B 2323/04* (2013.01); *B32B 2327/18* (2013.01); *B32B 2603/00* (2013.01); *C08J 2327/18* (2013.01); *C08J 2483/07* (2013.01); *C09J 2203/346* (2020.08); *C09J 2203/35* (2020.08); *C09J 2427/008* (2013.01); *C09J 2433/00* (2013.01); *F03D 80/40* (2016.05); *F05B 2240/30* (2013.01)

(56) References Cited

FOREIGN PATENT DOCUMENTS

| JP | 55078024 A | * | 6/1980 | ............ B29C 59/14 |
|---|---|---|---|---|
| JP | 2010001456 A | * | 1/2010 | |

OTHER PUBLICATIONS

English machine translation of CN106313811 (Year: 2017).*
English machine translation of DE102007006634 (Year: 2008).*
English machine translation of JP2010001456 (Year: 2010).*

* cited by examiner

METHOD FOR NANO-DEPTH SURFACE ACTIVATION OF PTFE-BASED MEMBRANE

FIELD

The present disclosure relates to the technical field of polymer composites, particularly to a method for nano-depth surface activation of a PTFE-based membrane.

BACKGROUND

Wind turbine generators installed in high-altitude and mountain areas and low-temperature and freezing areas in China are affected by climates. Blades are frozen in different degrees in each winter and thus work abnormally. An output power of a wind turbine cannot reach guaranteed power and the generators stop. A large amount of electricity charge is lost and even blade breakage accidents occur. Surfaces of the blades are iced and the technical method and efficiency of preventing and removing ice are insufficient, which directly cause loss of a wind power benefit. A safety risk of sharing generator operation is formed and a problem of icing of wind turbine blades is an important subject in the world of the wind power industry. Scientific research institutions at home and abroad and wind power industry are continuously conducting relevant research on technical materials for preventing and removing ice of the wind turbine blades.

Through a search of foreign databases and public documents on relevant websites, patent JP2003113254 discloses a wind turbine blade coating. The porous super-hydrophobic polyvinylidene fluoride membrane coating is prepared from raw materials of polyvinyl fluoride, polyvinylidene fluoride, dry ice, carbon powder, tung oil, polyvinyl formal, polyetherimide, straw powder, a preservative, a dispersant, a leveling agent, etc. to achieve a good anti-icing performance. International patent application WO2006058233 discloses a self-cleaning antireflection membrane compounding a homogenous double-layer $SiO_2$ with polytetrafluoroethylene for preventing blades from icing and a preparation method of the antireflection membrane. The antireflection membrane is prepared by compounding a dense silica layer, a porous silica nano rod layer and a polytetrafluoroethylene nano rod. The preparation method comprises the following steps: sequentially depositing three layers of a dense silica, porous silica layer and polytetrafluoroethylene nano rod compound membrane with a gradually decreased refractive index on a transparent or translucent substrate by using an electron beam vapor deposition method. Patent US20170028361 discloses a PFSA/PTFE composite membrane for preventing blades from icing. A method comprises the following steps: dissolving a perfluorosulfonate substance in an aqueous solution of a low-boiling organic alcohol solvent; adding a high-boiling organic solvent and silica sol to the solution to prepare a resin solution for forming a membrane; dragging a base membrane-expanded polytetrafluoroethylene microporous membrane to run on a bearing roller of a membrane-forming machine, soaking the base membrane in a low-concentration resin solution, drying at 40-100° C., soaking the dried base membrane in a high-concentration solution, drying at 40-100° C., repeatedly soaking in the high-concentration solution and drying until the composite membrane reaches a predetermined thickness, and putting the composite membrane in an oven to dry and shape at 120-200° C. to obtain a complete composite membrane. Patent EP2767330 discloses a composite for preventing blades from icing including a porous PTFE membrane. The porous PTFE membrane comprises an intermediate PTFE membrane having a pore diameter of about 2 nanometers to about 20 nanometers and is interposed between and bound to a porous fluoropolymer membrane having a larger pore diameter. Patent CN101821500A discloses a method for deicing a blade of a wind turbine, the wind turbine and a use method thereof. The method is used for de-icing the blade of the wind turbine after the wind turbine has been shut down for a period of time. Ice is shaken off from the blade by forming an accelerated state in the blade and then a decelerated state. But a large wind turbine has a relatively small amplitude of the blade, thus the solution is difficult to realize.

Related researches on preventing and removing the icing of the wind turbine blades are never interrupted by academic and scientific research institutions and wind power industry in China. The deicing method reported by published literatures includes mechanical deicing, liquid deicing, coating deicing, hot gas deicing, microwave deicing, vibration deicing, electric deicing, ultrasonic deicing, etc. Yaogang, et al. in School of Electrical Engineering and Automation, Wuhan University prepares a super-hydrophobic nano composite material and studies an influence of the material on icing. A method combining high-speed stirring and ultrasonic dispersion is used, nano $SiO_{2-x}$ treated by a coupling agent is uniformly dispersed in a fluorinated organic silicon resin with a hydrophobic property, and the prepared super-hydrophobic nano composite coating is used for preventing blades from icing. Patent 201610675902.4 discloses a preparation method and use of a PTFE and polyester-based composite membrane for preventing wind turbine blades from icing. The method includes steps of conducting lamination complexing using a bonding complexing agent, applying an interface adhesive and applying a photo-initiated pressure-sensitive adhesive using a pressure-sensitive adhesive. The bonding complexing agent is prepared from 3-isocyanatomethyl-3,5,5-trimethylcyclohexyl isocyanate, vinyl acetate, ethyl carbamate, alpha-linolenic acid, benzoyl peroxide, (4) ethoxylated bisphenol A dimethacrylate, etc. The photo-initiated pressure-sensitive adhesive is prepared from a poly [butyl acrylate-glycidyl methacrylate-n-butoxy methacrylamide] copolymer, butyl acrylate, (4) ethoxylated bisphenol A dimethacrylate, 4,4'-bis(diethylamino)benzophenone, dimethylformamide, etc. A technical problem that the PTFE and polyester composite membrane cannot be directly pasted on surfaces of the wind turbine blades with an adhesive is solved. A peel strength of is improved and the composite membrane can be used for preventing icing of various types of the wind turbine blades. Patent 201610670830.4 discloses a preparation method and use of a nano-modified PTFE and polyester-based composite membrane for preventing wind turbine blades from icing. The method includes steps of modifying a PTFE membrane, conducting lamination complexing and applying a photo-crosslinked adhesive. A modifier is prepared from antimony-doped tin oxide nano-crystals, nano-titanium dioxide, nano-silicon carbide, an organic fluorine waterproofing agent and pentaerythritol tri-(3-aziridinyl)-propionate. In the lamination complexing, a bonding complexing agent is prepared from 3-isocyanatomethyl-3,5,5-trimethylcyclohexyl isocyanate, vinyl acetate, ethyl carbamate, alpha-linolenic acid, (2) ethoxylated bisphenol A dimethacrylate, trimethylolpropane triacrylate and benzoyl peroxide. The photo-crosslinked adhesive is prepared from a poly [butyl acrylate-glycidyl methacrylate-n-butoxy methacrylamide] copolymer, vinyl acetate, butyl acrylate, an acrylate derivative, a photoinitiator and dimethylformamide. The method solves a problem that a modified PTFE and polyester-based composite membrane cannot be directly pasted on surfaces of the wind turbine blades with an adhesive. In "Research and analysis on anti-icing of wind turbine blades" published in Wind Energy (2016 (09)), under an effect of hot pressing and complexing process, a prepared nano modified PTFE membrane is bonded and complexed with polyester fabric at a high temperature to prepare a nano modified PTFE membrane and polyester fabric composite membrane, and the composite membrane is expected to become a new generation of anti-icing new material and technology capable of solving the world problem of wind turbine blade icing. Patent 201610675902.4 discloses a preparation method and use of a PTFE and polyester-based composite membrane for preventing wind turbine blades from icing. The method includes steps of conducting lamination complexing using a bonding complexing agent, applying an interface adhesive and applying a photo-initiated pressure-sensitive adhesive using a pressure-sensitive adhesive. Patent 201610452541.7 discloses a self-adhesive carbon fiber and steel fiber modified polytetrafluoroethylene material for preventing blades from icing and a preparation method thereof. Steel fibers and carbon fibers are used to improve a tensile strength and friction performance of polytetrafluoroethylene. At the same time, an improved melting method is used to sinter fine filling materials such as $SiO_2$, Al powder and the like on the surface of the polytetrafluoroethylene at a high temperature, thus a surface sintering state of the polytetrafluoroethylene is improved and a bonding strength is obviously improved. Patent 201310018649.1 discloses a preparation method of a self-bonding flexible polytetrafluoroethylene (PTFE) membrane belt for preventing blades from icing. The preparation method comprises the following steps: dispersing resin with the PTFE, adding a certain amount of organic silicon and solvent oil, mixing uniformly, and curing in a dryer at 50° C. for more than 12 h; prepressing the cured powder material into a column semi-finished product; and putting into an extruder to extrude round strip materials with a diameter of 20-25 mm, putting into warm water for thermal insulation, pressing into a membrane using a large roller calender, and conducting oil removing, transverse drawing, longitudinal drawing, sizing and slitting and the like. The PTFE membrane belt product with an excellent performance in sealing industry is obtained and has a density range of 400-1,100 $g/m^3$ and a tensile strength of 15-25 MPa. Patent 201720057571.8 discloses a light-operated thermal-insulated membrane for preventing blades from icing. The light-operated thermal-insulated membrane successively consists of a PET membrane, a titanium dioxide layer, a PTFE membrane, a hot-melt adhesive layer, a PET base membrane, a scratch resistance layer and an infrared ray resistance layer from inside to outside. Patent 201610990370.3 discloses a double-layer spinning membrane for preventing blades from icing and a preparation method thereof. An upper layer of the anti-icing double-layer spinning membrane is a super-hydrophobic spinning membrane coated with a silica coating and a lower layer of the anti-icing double-layer spinning membrane is a hydrophilic spinning membrane filled with deicing liquid. Liu Shengxian, et al. in Changsha University of Science and Technology defines parameters of an icing state of wind turbine blades through a simulation experiment analysis of dynamic characteristics of the wind turbine blades in different icing states, obtains characteristic value indexes of the blades in the icing state through simulation calculation, and thus studies a wind turbine blade icing state diagnosis technology based on vibration detection. Goldwind Technology develops an electro-thermal deicing technical solution. Heating elements such as carbon fiber electro-thermal membranes or resistance wires are embedded in a coating of a blade. The heating elements include carbon fiber, heating resistors, metal heating meshes, conductive heating membranes, etc. The heating elements constitute an electrothermal ice-preventing and removing system with an overheating protection converter, a power supply, etc. Therefore, ice on the surfaces of the blades is melted through electric heating to achieve effects of preventing and removing ice. Windey develops a deicing technology by hot air generated by inputting electrical heating in a cavity of a blade. A hot air ventilation pipe is arranged in the cavity of the blade and a heating device is arranged in a hub of a wind turbine, such that the hot air or hot air heated by other radiation sources circulates in the ventilation pipe. Heat is delivered to an outer surface of the blade through a shell of the blade, such that the blade has a certain temperature and is indirectly heated under the hot air to prevent sub-cooled water drops from being frozen to achieve a purpose of preventing and removing ice.

To sum up, there are many technical methods for preventing and removing ice of wind turbine blades at home and abroad. However, among all the technical methods, some are only in basic research and some have been experimentally applied, but none of them can achieve an ideal effect of preventing and removing ice. Especially, the ice-preventing and removing method using the resistance wires and electrothermal air has an unobvious ice-preventing and removing effect, and makes the weight of each blade increased by 200 kg and the weight of the blades of the entire wind turbine generator increased by 600 kg, which greatly increases the weight load of the wind turbine blade and increases the power consumption rate of the factory by more than 8-10%. If a blade has an electrical heating fault or fails, the entire electrical heating deicing system must stop running, otherwise weight unbalance and serious barycenter offset are caused by different icing mass of the blade so as to cause faults or accidents. At the same time, there are safety hazards that the blade is easily struck by lightning.

Although a PTFE material has a low surface tension, after the material is prepared into a PTFE-based membrane, the membrane still cannot resist adhesion of ice crystals on surfaces of the wind turbine blades only by a non-adhesion performance due to the low surface tension and further cannot truly achieve an effect of preventing and removing the icing on the surface of the wind turbine blades. However, if no measures are made to modify the PTFE, the prepared PTFE-based membrane cannot be directly and firmly bonded on the surfaces of the wind turbine blades. The modified PTFE-based membrane has a greatly reduced advantage of the low surface tension.

SUMMARY

In order to solve the technical problems, the present disclosure discloses a method of preparing a polytetrafluoroethylene (PFFE)-based membrane for bonding. The method comprises the following steps: preparing a PTFE based membrane with a nano-scale and micron-scale concave-convex geometrical ultra-micro-structure morphology, and covering a surface of the PTFE-based membrane, before a bonding adhesive is applied, performing surface activation treatment in a vacuum environment where a nitrogen-hydrogen mixed medium atmosphere below 40° C. at a speed of 1.5-3 m/min on the other surface of the membrane to which a bonding adhesive is to be applied and enabling the adhesive-applied surface of the membrane to generate a nano-depth activated structure layer; and applying a high-toughness cold bonding adhesive tape on the nano-depth activated structure layer with a mechanical adhesive applying device, wherein a functional group of an adhesive in the high-toughness cold bonding adhesive tape is chemically bonded to the nano-depth activated structure layer to form an adhesive-membrane complex.

The high-toughness cold bonding adhesive tape is prepared by the following steps: adding 0.2 kg of PVA-1788, 18 kg of butyl acrylate, 0.5 kg of acrylic acid, 1.0 kg of vinyl acetate, 1.0 kg of methyl methacrylate, 1.5 kg of an organosilicone monomer, 0.01 kg of TO-7, 0.01 kg of sodium dodecylbenzenesulfonate, 0.05 kg of benzoyl peroxide and 80 kg of water into a preparation tank for preparation at a temperature of 85° C. for 5 h, vacuuming and removing water, obtaining a pressure-sensitive tape with a solid content of 18.7%, complexing the pressure-sensitive tape on a release paper and rolling the release paper on a PVC tube core.

Technical effects: the present disclosure conducts nano-depth surface activation on a PTFE-based nano functional composite membrane, such that a surface of the PTFE-based nano functional composite membrane can generate a nano-depth activated structure layer. The nano-depth activated structure layer and a functional group of an adhesive are subjected to a chemical bonding, thus an extremely strong affinity and a high-strength bonding performance are generated between the membrane and the adhesive, and the adhesive-membrane complex is formed.

Integration of membrane/adhesive bonding complexing, membrane/membrane bonding complexing and membrane/adhesive layer bonding is realized. Meanwhile, a bonding strength, a peel force and a durability of a bonding force of the adhesive are improved. A technical problem that a PTFE material cannot bond to any other materials is solved.

The technical solution of the present disclosure is further limited:

Furthermore, the functional surface of a PTFE based membrane is covered with a PE membrane.

The method for nano-depth surface activation of a PTFE-based membrane, wherein the PTFE based membrane with a nano-scale and micron-scale concave-convex geometrical ultra-micro-structure morphology is prepared by the following steps:

(1) preparing PTFE-based composite membrane by monomer fusion polymerization and micro-polymerization 1) preparing a rod material by blending, pre-pressing and pushing infiltrating a PTFE resin with silicone oil capable of softening PTFE, blending the infiltrated PTFE resin, and conducting hot pre-pressing and hot pushing at a temperature of 60-90° C., a speed of 20-30 m/min and a pressure of 5-8 MPa to obtain a monomer polymerized PTFE rod material with a surface lubricity;

2) preparing a membrane by fusion polymerization under hot calendering conducting fusion polymerization of the prepared PTFE rod material under hot calendering at a temperature of 60-90° C. and a speed of 20-30 m/min, extruding the silicone oil with a monomer polymerization effect blended in the PTFE resin out of a hot calender under the action of temperature to obtain a PTFE-based composite membrane with micron-scale pores, and rolling the membrane into a roll;

wherein under the actions of temperature and stretching of the hot calendering, the PTFE-based composite membrane is cracked and presents a fibrous structure after a laminar exfoliation; and a PTFE-based composite membrane with a micro-pored nano-scale and micron-scale concave-convex geometrical ultra-micro-structure morphology is formed, and has a thickness of 100-120 micrometer and a milky white color; and 3) preparing a homogeneous membrane by micro-polymerization micro-polymerizing the PTFE-based composite membrane with a micron-scale micro-concave-convex surface structure in an oil-removing oven by the action of temperature at a temperature of 180-200° C., polymerizing and consolidating the silicone oil infiltrating the PTFE resin for the monomer polymerization and not squeezed completely by the hot calender under the action of temperature to obtain the PTFE based membrane which is homogenous, and rolling the PTFE based membrane in the oil-removing oven at a speed of 6- 8 m/min; and (2) preparing a PTFE based membrane by a high-temperature high-linear-pressure cavity setting a temperature in a high-temperature high-linear-pressure cavity at 70-420° C., putting the PTFE based membrane forwards at a speed of 6-8 m/min, enabling membrane molecular chains to shrink and generate eutectic phases by the high temperature in the cavity and micro-pores to be nano-scale and ultra-micron-scale, controlling a linear pressure of a surface of the PTFE based membrane to be 50-80 N/m, enabling the color of the membrane to change from milky white to transparent with uniform transparency, and maintaining an original nano-scale and micron-scale concave-convex geometrical ultra-micro-structure morphology of the PTFE based membrane.

The present disclosure has the following beneficial effects:

(1) On the basis of fully utilizing a low surface tension performance of a PTFE-based material, the present disclosure adopts a monomer fusion polymerization and micro-polymerization technology to prepare a membrane with a multi-nano-scale and micron-scale concave-convex geometrical ultra-micro-structure morphology, such that the PTFE-based membrane has functional characteristics of ultralow surface tension, hydrophobicity, non-adhesiveness, high pollution resistance, moisture absorption resistance, self-cleaning property and the like. The ultra-high temperature ultra-high pressure intensity micro-eutectic technology enhances a structural strength of the membrane, solves a technical problem of a reduced abrasion resistance since the PTFE-based membrane presents a fibrous structure during cracking in the high temperature after a laminar exfoliation, reduces pores through the action of temperature, thus improves transparency and transparency consistency of the membrane, maintains an ultra-micro structured surface morphology of the PTFE-based nano functional composite membrane and enables the membrane to have a higher abrasion resistance, toughness and impact resistance. A nano-depth surface activation technology enables the membrane and the adhesive to be chemically bonded, and thus enhances a bonding strength, a peel force and a durability of a bonding force.

(2) Aiming at characteristics, application requirements and use environment of the PTFE membrane, a high-toughness cold bonding adhesive with a cold-bonding function is specially prepared. The high-toughness cold bonding adhesive can be directly subjected to a cold bonding, has high peel strength, tensile elongation at break and impact strength, relatively small hardness and tensile elastic modulus, and long ultraviolet aging resistance and aging resistance time, is free of an obvious plastic deformation property, has a thermal expansion and cold contraction stress smaller than an elastic limit, is always in a toughness state, and has relatively high bonding strength and lasting bonding peel force.

(3) The PTFE-based nano functional composite membrane prepared by the present disclosure has higher transparency, does not change an original surface color of an adhered blade, has a thickness of 100-200 micrometer, a weight of 200-300 g/m$^2$ and a surface roughness of 0.18 micrometer, does not increase the load of the wind turbine blade, and can improve an aerodynamic performance of an airfoil of the blade and the operating efficiency of the blade.

(4) The PTFE-based nano functional composite membrane prepared by the present disclosure can generate a chemical bonding effect with a functional group of the adhesive without modifying the PTFE material, such that the adhesive and the membrane have extremely strong affinity and adhesive strength, and a selection range of the adhesive is expanded.

(5) The PTFE-based nano functional composite membrane prepared by the present disclosure has excellent ultraviolet resistance and weather resistance of the PTFE material, is equivalent to a protective coat of the blade, can enhance a surface strength of the blade, plays a role in integrally fixing, improves integral bearing capacity and erosion resistance of the blade, eliminates potential safety hazards of blade aging, cracking and the like, and further prolongs a service life of the wind turbine blade.

DETAILED DESCRIPTION

Figure 1:
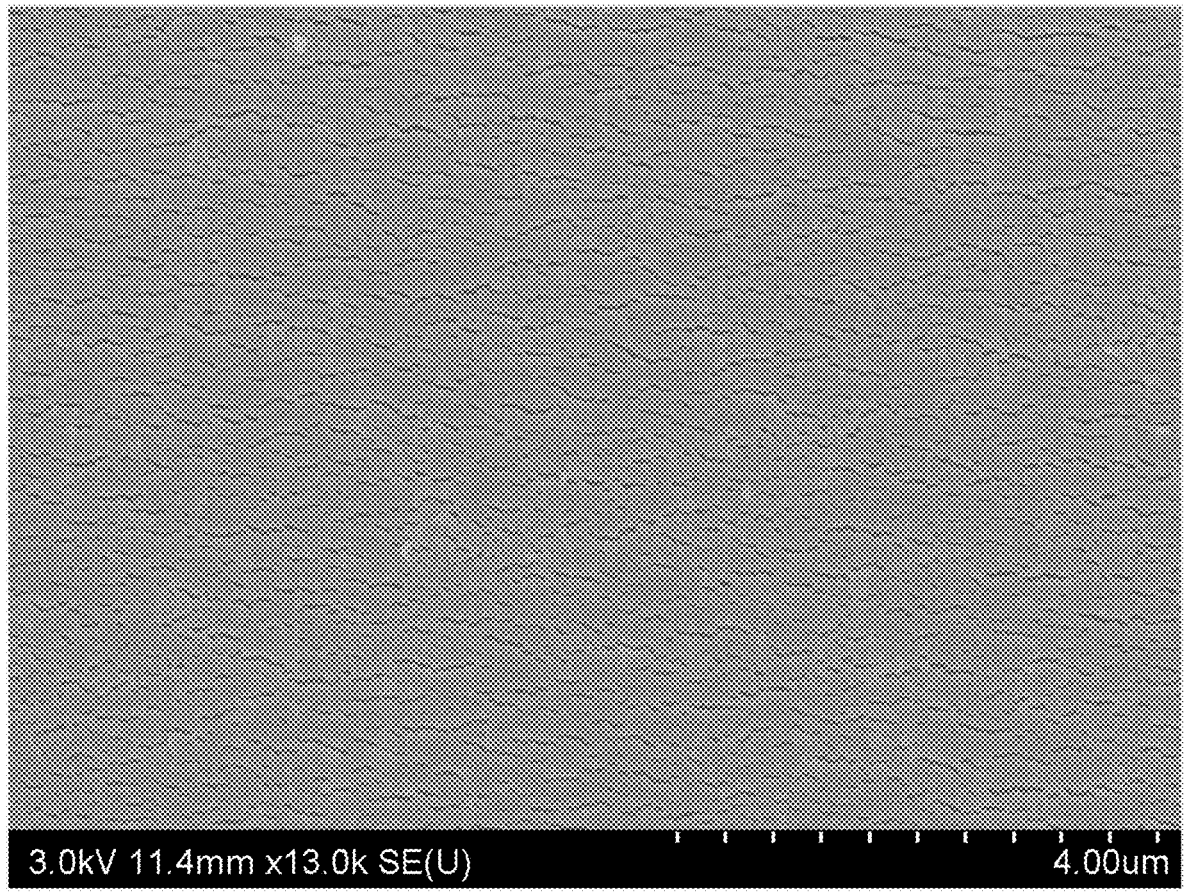
FIG. 1 is a scanning electron microscope (SEM) image of a membrane surface nano-depth active structure layer before treatment of a membrane surface.

The example provides a method for nano-depth surface activation of a polytetrafluoroethylene (PFFE)-based membrane. The method comprises the following steps: covering, with a polyethylene (PE) membrane, a functional surface of a PTFE-based nano functional composite membrane with a nano-scale and micron-scale concave-convex geometrical ultra-micro-structure morphology, before a bonding adhesive is applied, performing surface activation treatment in a vacuum environment where a nitrogen-hydrogen mixed medium atmosphere below 40° C. is injected, at a speed of 3 m/min on a single surface (the other surface) of the membrane to which a bonding adhesive is to be applied, and enabling the adhesive-applied surface of the membrane to generate a nano-depth activated structure layer, and migrating and complexing a high-toughness cold bonding adhesive tape on the membrane surface, with the activated structure layer, of the PTFE-based nano functional composite membrane through a mechanical adhesive applying device, and enabling a functional group of the adhesive and the activated structural layer of the membrane to be chemically bonded to form an adhesive-membrane complex.

The high-toughness cold bonding adhesive tape is prepared by the following steps: adding 0.2 kg of PVA-1788 (a partially hydrolyzed polyvinyl alcohol), 18 kg of butyl acrylate, 0.5 kg of acrylic acid, 1.0 kg of vinyl acetate, 1.0 kg of methyl methacrylate, 1.5 kg of an organosilicone monomer, 0.01 kg of TO-7 (Lutensol TO 7, a nonionic surfactant based on iso-C13-alcohol), 0.01 kg of sodium dodecylbenzenesulfonate, 0.05 kg of benzoyl peroxide and 80 kg of water into a preparation tank for preparation at a temperature of 85° C. for 5 h, vacuuming and removing water, obtaining a pressure-sensitive tape with a solid content of 18.7%, complexing the pressure-sensitive tape on a release paper and rolling the release paper on a PVC tube core.

The PTFE-based nano functional composite membrane with a nano-scale and micron-scale concave-convex geometrical ultra-micro-structure morphology is prepared by the following steps:

(1) preparing a PTFE-based nano functional composite membrane by monomer fusion polymerization (a primary pretreatment) and micro-polymerization (a secondary pretreatment 1) preparing a rod material by blending, pre-pressing and pushing infiltrating a PTFE resin with silicone oil capable of softening PTFE with a mass ratio of the vinyl silicone oil and the PTFE resin at 2.5:100, blending the infiltrated PTFE resin, and conducting hot pre-pressing and hot pushing at a temperature of 60° C. to the PTFE resin (a primary polymerization), a speed of 25 m/min and a pressure of 8 MPa to obtain a monomer polymerized PTFE rod material with a diameter of 17 mm and a surface lubricity;

2) preparing a membrane by fusion polymerization under hot calendering conducting fusion polymerization (a secondary polymerization) of the prepared PTFE rod material under hot calendering at a temperature of 60° C. and a speed of 25 m/min, extruding the silicone oil with a monomer polymerization effect blended in the PTFE resin out of a hot calender under the action of temperature to obtain a PTFE-based nano functional composite membrane with micron-scale pores, and rolling the membrane into a roll;

wherein under the actions of temperature and stretching of the hot calendering, the cracked membrane presents a fibrous structure after a laminar exfoliation; and a PTFE-based membrane with a micro-pored nano-scale and micron-scale concave-convex geometrical ultra-micro-structure morphology is formed, and has a thickness of 100 microns and a milky white color; and 3) preparing a homogeneous membrane by micro-polymerization (a tertiary polymerization)

micro-polymerizing the PTFE-based nano functional composite membrane with a micron-scale micro-concave-convex surface structure in an oil-removing oven by the action of temperature at a temperature of 200° C., polymerizing and consolidating (which is the tertiary polymerization) the silicone oil infiltrating the PTFE resin for the monomer polymerization and not squeezed completely by the hot calender under the action of temperature to obtain a PTFE-based homogenous membrane, and rolling the roll-shaped PTFE-based membrane in the oil-removing oven at a speed of 6 m/min; and (2) preparing a PTFE-based nano functional composite membrane by a high-temperature high-linear-pressure cavity setting a temperature in a high-temperature high-linear-pressure cavity at 380° C., putting the PTFE-based nano functional composite membrane forwards at a speed of 6 m/min, enabling membrane molecular chains to shrink and generate eutectic phases by the high temperature in the cavity and micro-pores to be nano-scale and ultra-micron-scale, controlling a linear pressure of a surface of the PTFE-based membrane to be 60 N/m, enabling the color of the membrane to change from milky white to transparent with uniform transparency and the membrane to have a density of 2.1 kg/m³ and maintaining an original nano-scale and micron-scale concave-convex geometrical ultra-micro-structure morphology of the PTFE-based membrane.

In order to improve an ultra-low surface tension and a non-adhesion performance of the PTFE-based nano functional composite membrane which is used in a wind turbine blade, the monomer fusion polymerization and micro-polymerization method is used to prepare the composite membrane with a nano-scale and micron-scale concave-convex geometrical ultra-micro-structure morphology. Besides, the composite membrane has higher abrasion resistance, toughness, membrane structural strength and high transparency by the ultra-high temperature ultra-high pressure intensity micro-eutectic method, such that it is more difficult to obtain a proper bonding adhesive for bonding the membrane on surfaces of the blade. Therefore, the adhesive-applied surface of the PTFE-based nano functional composite membrane needs to be subjected to the nano-depth surface activation.

Figure 2:
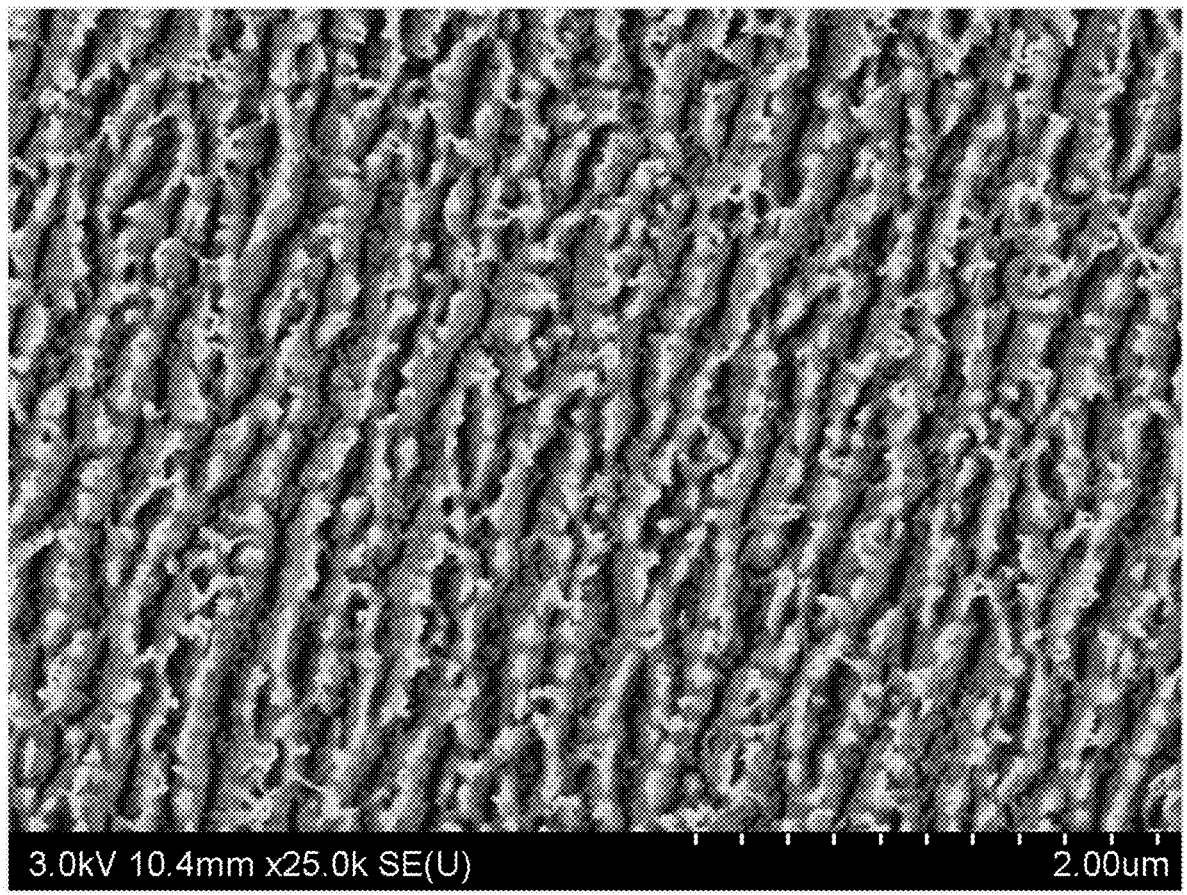
FIG. 2 is a scanning electron microscope (SEM) image of a membrane surface nano-depth active structure layer after treatment of a membrane surface.

As shown in FIG. 1-2, the PTFE-based nano functional composite membrane prepared by the present invention has a non-adhesive property and a low surface tension. Meanwhile, the membrane with a nano-scale and micron-scale concave-convex geometrical ultra-micro-structure morphology has an ultra-low surface tension of solids, a better hydrophobic property, a non-adhesion property, a high antipollution property and a surface self-cleaning function. The PTFE-based nano functional composite membrane prepared by ultra-high temperature and high pressure intensity as described in the step of (2) preparing a PTFE-based nano functional composite membrane by a high-temperature high-linear-pressure cavity, has higher abrasion resistance, toughness and impact resistance, has functional characteristics of resisting abrasion and impact of dust, hailstones and freezing rain, rain erosion and impact of electric arcs of lightning, such that the PTFE-based nano functional composite membrane can be used for a long time at a linear speed of 300 km/h of a tip of a wind turbine blade without being abraded, simultaneously has a characteristic of incombustibility, and cannot be combusted by the electric arcs of the lightning.

5 PTFE-based membrane samples obtained in the method are subjected to various performance tests and the average results of the 5 samples are as follows: (1) the membrane has an average thickness of 100 micrometer; (2) the membrane has an average weight of 210 g/m²; (3) the membrane has a peel force of 50 N and a 180° peel strength of 1,000 N/m; (4) the membrane has an average tensile strength of 25 Mpa before and after aging and an average elongation rate of more than 90%, and shows no aging by a xenon lamp aging test, a freeze-thaw cycle performance test (a temperature of −60° C. to 150° C. and a humidity of 5-98%), an ozone aging test, an ultraviolet aging test and an artificial atmosphere corrosion and sea salt solution soaking test for 14,400 h; (5) the membrane does not have a rough surface and is free of damage to expose a substrate after 37 times/min of reciprocating friction for 40,000 times using a method in GB/T 9266-2009 "Determination of scrub resistance of film of architectural paints and coatings", and thus has a strong abrasion resistance; (6) a dynamic wind pressure test platform is used to simulate a wind speed of 36.9 m/s (12-grade typhoon) to carry out a dynamic wind pressure test on a rain wash resistance, and the membrane does not have a rough surface and has an excellent rain erosion resistance after subjected to a strong-wind-speed water-blowing test for 1,000 h; (7) after tested by a scanning electron microscope (SEM), the surface morphology of the membrane shows micron-scale micro concave-convex surface structures with an average size of 20-40 micrometer, a height of 10-20 micrometer and a spacing of 30-50 micrometer uniformly distributed in a warp and weft direction; (8) a contact angle of water drops on the surface of the membrane measured by a water contact angle tester is between 115.89°-125.46°; and (9) an average membrane surface roughness measured by a surface roughness meter is 0.18 micrometer.

In conclusion, the PTFE-based membrane is subjected to nano-depth surface activation. The prepared PTFE-based nano functional composite membrane has ultralow surface tension, adhesion resistance, contamination resistance, hydrophobicity, moisture absorption resistance and self-cleaning property due to an ultramicro surface structure appearance. The composite membrane has ultrahigh abrasion resistance, toughness, impact resistance, rain erosion resistance and extreme chemical corrosion resistance, can resist corrosion, high and low temperatures, aging, chemical resistance, ultraviolet and fatigue, enhances a surface strength of a wind turbine blade, plays a role in integrally fixing, improves integral bearing capacity and erosion resistance of the blade, eliminates potential safety hazards such as blade aging and cracking and the like, enhances the long-term erosion resistance of the blade to foreign objects, enable the blade to be doubly protected, and prolongs the service life of the blade. The composite membrane has electric insulation and incombustibility, can resist high voltage of 15,000 volts, has a high temperature resistance, and has no trace on the surface and is not combusted when struck by electric arcs of lightning. The composite membrane can improve an aerodynamic performance of an airfoil and use efficiency of wind energy due to an ultra-thin thickness, an ultra-light weight and an ultra-low surface roughness. A self-adhesive cold bonding function of the composite membrane facilitates use in the wind turbine blades.

The disclosure may have other implementations in addition to those described above. All technical solutions formed by equivalent replacements or equivalent transformations should fall within the protection scope of the present disclosure.

The invention claimed is:

1. A method of preparing a polytetrafluoroethylene (PTFE)-based membrane for bonding, comprising the following steps:
preparing a PTFE based membrane with a nano-scale and micron-scale concave-convex geometrical ultra-microstructure morphology, and covering a surface of the PTFE based membrane,
performing surface activation treatment in a vacuum environment where a nitrogen-hydrogen mixed medium atmosphere below 40° C. is provided, at a speed of 1.5-3 m/min on an other surface of the PTFE based membrane, and enabling the other surface of the PTFE based membrane to generate an activated structure layer; and
applying a high-toughness cold bonding adhesive tape on the activated structure layer with a mechanical adhesive applying device, wherein a functional group of an adhesive in the high-toughness cold bonding adhesive tape is chemically bonded to the activated structure layer to form the PFFE-based membrane for bonding; wherein,
preparing the high-toughness cold bonding adhesive tape comprising the following steps: adding 0.2 kg of a partially hydrolyzed polyvinyl alcohol, 18 kg of butyl acrylate, 0.5 kg of acrylic acid, 1.0 kg of vinyl acetate, 1.0 kg of methyl methacrylate, 1.5 kg of an organosilicone monomer, 0.01 kg of a nonionic surfactant based on iso-C13-alcohol, 0.01 kg of sodium dodecylbenzenesulfonate, 0.05 kg of benzoyl peroxide and 80 kg of water into a preparation tank for preparation at a temperature of 85° C. for 5 h, vacuuming and removing water, obtaining the adhesive in the high-toughness cold bonding adhesive tape with a solid content of 18.7%, complexing the adhesive on a release paper and rolling the release paper on a PVC tube core.

2. The method according to claim 1, wherein the surface of the PTFE-based membrane is covered by a polyethylene membrane.

3. The method according to claim 1, wherein preparing the PTFE based membrane with the nano-scale and micron-scale concave-convex geometrical ultra-micro-structure morphology comprises the following steps:
infiltrating a PTFE resin with silicone oil capable of softening PTFE, blending the infiltrated PTFE resin, and conducting hot-pressing and hot pushing to the infiltrated PTFE resin at a temperature of 60-90° C., a speed of 20-30 m/min and a pressure of 5-8 MPa to obtain a monomer polymerized PTFE rod material with a surface lubricity;
conducting fusion polymerization of the monomer polymerized PTFE rod material under hot calendering at a temperature of 60-90° C. and a speed of 20-30 m/min to obtain a PTFE-based composite membrane, and rolling into a roll;
wherein under actions of temperature and stretching of the hot calendering, the PTFE-based composite membrane is cracked and presents a fibrous structure after a laminar exfoliation; and a PTFE-based composite membrane with the nano-scale and micro-scale concave-convex geometrical ultra-micro-structure morphology is formed, and has a thickness of 100-120 μm and a milky white color; and
micro-polymerizing the PTFE-based composite membrane with the nano-scale and micron scale concave-convex geometrical ultra-micro-structure morphology in an oil-removing oven at a temperature of 180-200° C. and consolidating and squeezing the silicone oil infiltrating the PTFE resin with a hot calender to obtain the PTFE based membrane, and rolling the PTFE based membrane in the oil-removing oven at a speed of 6-8 m/min; and
setting a temperature in a high-temperature high-linear-pressure cavity at 70-420° C., putting the PTFE based membrane forwards at a speed of 6-8 m/min, enabling membrane molecular chains to shrink and generate eutectic phases by the high temperature in the cavity and micro-pores to be nano-scale and ultra-micron-scale, controlling a linear pressure of a surface of the PTFE based membrane to be 50-80 N/m, enabling the color of the PTFE based membrane to change from milky white to transparent with uniform transparency, and maintaining the nano-scale and micron-scale concave-convex geometrical ultra-micro-structure morphology of the PTFE based membrane.

4. The method according to claim 3, wherein the silicone oil is a vinyl silicone oil and the vinyl silicone oil and the PTFE resin are blended at a mass ratio of 2:100 to 3:100.

5. The method according to claim 1, wherein preparing the PTFE based membrane with the nano-scale and micron-scale concave-convex geometrical ultra-micro-structure morphology comprises the following steps:
infiltrating a PTFE resin with vinyl silicone oil capable of softening PTFE wherein a mass ratio of the vinyl silicone oil and the PTFE resin is 2.5:100, blending the infiltrated PTFE resin, and conducting hot-pressing and hot pushing to the infiltrated PTFE resin at a temperature of 60° C., a speed of 25 m/min and a pressure of 8 MPa to obtain a monomer polymerized PTFE rod material with a diameter of 17 mm and a surface lubricity;
conducting fusion polymerization of the monomer polymerized PTFE rod material under hot calendering at a temperature of 60° C. and a speed of 25 m/min to obtain a PTFE-based composite membrane, and rolling into a roll;
wherein under actions of temperature and stretching of the hot calendering, the PTFE-based composite membrane is cracked and presents a fibrous structure after a laminar exfoliation; and a PTFE-based composite membrane with the nano-scale and micro-scale concave-convex geometrical ultra-micro-structure morphology is formed, and has a thickness of 100 μm and a milky white color; and
micro-polymerizing the PTFE-based composite membrane with the nano-scale and micron scale concave-convex geometrical ultra-micro-structure morphology in an oil-removing oven at a temperature of 200° C. and consolidating and squeezing the silicone oil infiltrating the PTFE resin with a hot calender to obtain the PTFE based membrane, and rolling the PTFE based membrane in the oil-removing oven at a speed of 6 m/min; and
setting a temperature in a high-temperature high-linear-pressure cavity at 380° C., putting the PTFE based membrane forwards at a speed of 6 m/min, enabling membrane molecular chains to shrink and generate eutectic phases by the high temperature in the cavity and micro-pores to be nano-scale and ultra-micron-scale, controlling a linear pressure of a surface of the PTFE based membrane to be 50-80 N/m, enabling the color of the PTFE based membrane to change from milky white to transparent with uniform transparency and the PTFE based membrane to have a density of 2.1 kg/m$^3$ and maintaining the nano-scale and micron-scale concave-convex geometrical ultra-micro-structure morphology of the PTFE based membrane.

* * * * *